United States Patent [19]

Lindsay

[11] Patent Number: 5,654,546
[45] Date of Patent: Aug. 5, 1997

[54] VARIABLE TEMPERATURE SCANNING PROBE MICROSCOPE BASED ON A PELTIER DEVICE

[75] Inventor: Stuart M. Lindsay, Tempe, Ariz.

[73] Assignee: Molecular Imaging Corporation, Phoenix, Ariz.

[21] Appl. No.: 551,836

[22] Filed: Nov. 7, 1995

[51] Int. Cl.$^6$ ........................................ H01J 37/26
[52] U.S. Cl. ............... 250/306; 250/443.1; 250/442.11; 250/441.11; 73/105
[58] Field of Search ................. 250/443.1, 442.11, 250/441.11, 306; 73/105

[56] References Cited

U.S. PATENT DOCUMENTS

| Re. 33,387 | 10/1990 | Binnig ........................... 250/306 |
| Re. 33,587 | 5/1991 | Harnden, Jr. et al. ........... 29/25.35 |
| Re. 34,331 | 8/1993 | Elings et al. .................... 250/306 |
| Re. 34,489 | 12/1993 | Hansma et al. .................. 250/360 |
| 4,317,036 | 2/1982 | Wang ............................. 250/274 |
| 4,343,993 | 8/1982 | Binnig et al. .................... 250/306 |
| 4,591,722 | 5/1986 | Biddlecomb et al. .......... 250/443.1 |
| 4,724,318 | 2/1988 | Binnig ........................... 250/306 |
| 4,747,698 | 5/1988 | Wickramasinghe et al. ........ 374/6 |
| 4,785,177 | 11/1988 | Besocke ........................ 250/442.1 |
| 4,800,274 | 1/1989 | Hansma et al. .................. 250/306 |
| 4,806,755 | 2/1989 | Duerig et al. ................... 250/306 |
| 4,841,148 | 6/1989 | Lyding ........................... 250/306 |
| 4,866,271 | 9/1989 | Ono et al. ....................... 250/306 |
| 4,868,396 | 9/1989 | Lindsay et al. .................. 250/440.1 |
| 4,871,938 | 10/1989 | Elings et al. .................... 310/328 |
| 4,877,957 | 10/1989 | Okada et al. .................... 250/306 |
| 4,894,537 | 1/1990 | Blackford et al. ............... 250/306 |
| 4,914,293 | 4/1990 | Hayashi et al. .................. 250/306 |
| 4,947,042 | 8/1990 | Nishioka et al. ............... 250/442.11 |
| 4,950,900 | 8/1990 | Takechuti et al. ................ 250/346 |
| 4,969,978 | 11/1990 | Tomita et al. .................. 204/153.1 |
| 5,023,452 | 6/1991 | Purcell et al. ................... 250/506 |
| 5,025,658 | 6/1991 | Elings et al. ...................... 73/105 |

(List continued on next page.)

FOREIGN PATENT DOCUMENTS 6-59004  3/1994  Japan ............................... 33/2

OTHER PUBLICATIONS

Binnig, et al., "Single–Tube Three–Dimensional Scanner for Scanning Tunneling Microscopy", Aug. 1986, Rev. Sci. Instrm., 57 (8), pp. 1688–1689.

Brede, et al, "Brittle Crack Propagation in Silicon Single Crystals", Jul. 15, 1991, Journal of Applied Physics, 70 (2), pp. 758–771.

Davidsson, et al., "A New Symmetric Scanning Tunneling Microscope Design", Mar./Apr. 1988, Journal of Vacuum Science & Technology, Part A, No. 2, pp. 380–382.

(List continued on next page.)

Primary Examiner—Jack I. Berman
Attorney, Agent, or Firm—D'Alessandro & Ritchie

[57] ABSTRACT

A compact Peltier Device is used to heat or cool a small sample stage of a scanning probe (AFM or STM) microscope. The entire heating/cooling system may fit onto a small platen which may be suspended below the scanning probe where it may be held in place against magnetic balls. Alternatively, the sample stage may be supported by a Peltier Device, itself supported by a scanner such as a Piezoelectric scanner with a scanning probe tip held fixedly above the sample stage. The side of the Peltier Device in contact with the platen is cooled (or heated) by a small flow of water through a heat exchanger. The reservoir of water is held at ambient temperature, minimizing the temperature gradient generated between the sample platen and the main body of the microscope. The small mass of the sample stage results in rapid heating or cooling so that an equilibrium is attained rapidly. Heat transfer through the scanning tip is negligible. Condensation and contamination of the sample is prevented by operating the entire sample chamber in an inert gas environment. The inert gas is also at ambient temperature. Water and other contaminants are first removed from the gas by passing it over cold baffles. It is then equilibrated back up to ambient temperature in a heat exchanger.

33 Claims, 4 Drawing Sheets

U.S. PATENT DOCUMENTS

| | | | |
|---|---|---|---|
| 5,047,637 | 9/1991 | Toda | 250/443.1 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,106,729 | 4/1992 | Lindsay et al. | 435/6 |
| 5,120,959 | 6/1992 | Tomita | 250/306 |
| 5,144,833 | 9/1992 | Amer et al. | 73/105 |
| 5,155,715 | 10/1992 | Ueyema et al. | 369/44.11 |
| 5,157,251 | 10/1992 | Albrecht et al. | 250/216 |
| 5,166,615 | 11/1992 | Sidles | 324/307 |
| 5,172,002 | 12/1992 | Marshall | 250/561 |
| 5,189,906 | 3/1993 | Elings et al. | 73/105 |
| 5,200,616 | 4/1993 | Kokawa et al. | 250/441.11 |
| 5,202,004 | 4/1993 | Kwak et al. | 204/153.1 |
| 5,224,376 | 7/1993 | Elings et al. | 73/105 |
| 5,247,186 | 9/1993 | Toda | 250/561 |
| 5,253,516 | 10/1993 | Elings et al. | 73/105 |
| 5,260,577 | 11/1993 | Abraham et al. | 250/442.11 |
| 5,260,824 | 11/1993 | Okada et al. | 359/368 |
| 5,291,775 | 3/1994 | Gamble et al. | 73/105 |
| 5,294,804 | 3/1994 | Kajimura | 250/561 |
| 5,296,704 | 3/1994 | Mishima et al. | 250/306 |
| 5,298,748 | 3/1994 | Kenny et al. | 250/338.1 |
| 5,307,693 | 5/1994 | Griffith et al. | 73/862.68 |
| 5,314,254 | 5/1994 | Yashar et al. | 384/49 |
| 5,317,153 | 5/1994 | Matsushiro et al. | 250/306 |
| 5,319,960 | 6/1994 | Gamble et al. | 73/105 |
| 5,325,010 | 6/1994 | Besocke et al. | 310/317 |
| 5,357,105 | 10/1994 | Harp et al. | 250/234 |
| 5,363,697 | 11/1994 | Nakagawa | 73/105 |
| 5,388,452 | 2/1995 | Harp et al. | 73/105 |
| 5,410,910 | 5/1995 | Somlyo et al. | 250/306 |
| 5,461,907 | 10/1995 | Tench et al. | 73/105 |
| 5,468,959 | 11/1995 | Tohda et al. | 250/306 |

OTHER PUBLICATIONS

Drake, et al., "Imaging Crystals, Polymers, and Processes in Water with the Atomic Force Microscope", Mar. 1989, Science, vol. 243, pp. 1586–1589.

Hansma, et al., "Atomic Force Microscope", Jul. 15, 1994, J. Appl. Phys., 76 (2) pp. 796–799.

Jung, et al., "Novel Stationary–Sample Atomic Force Microscope with Beam–Tracking Lens", Feb. 4, 1993, Electronic Letters, 29 (3), pp. 264–265.

Marti, et al., "Atomic Force Microscopy of Liquid Covered Surfaces: Atomic resolution images:", Aug. 17, 1987, Appl. Phys. Lett., 51 (7), pp. 484–486.

Martin, et al., "Atomic Force Microscope Force Mapping and Profiling on a Sub 100 Å Scale", May 15, 1987, J. Appl. Phys., 61 (10), pp. 4723–4729.

Mou, et al., "An Optical Detection for Temperature Atomic Force Microscope at Ambient Pressure for Biological Research", Jun. 1993, Rev. Sci. Instrum., 64 (6), pp. 1483–1487.

Ohnesorge, et al., "True Atomic Resolution by Atomic Force Microscopy Through Repulsive and Attractive Forces", Science, Jun. 4, 1993, vol. 260, pp. 1451–1456.

Sonnenfield, et al., "Semiconductor Topography in Aqueous Environments: Tunneling Microscopy of Chemomechanically Polished (001) GaAs", Jun. 15, 1987, Appl. Phys. Lett., 50(24), pp. 1742–1744.

Specht, et al. "Simultaneous Measurement of Tunneling Current and Force as a Function of Position through a Lipid Film on Solid Substrate", Jul. 22, 1991, Surface Science Letters, (257), pp. L683–L658.

Travaglini, et al., "Scanning Tunneling Microscopy on Biological Matter", Sep. 1986, Surface Science, 181, pp. 380–390.

Yang, et al., "Atomic Force Microscopy of DNA Molecules", Apr. 1992, FEBS 10933, vol. 301, No. 2, pp. 173–176.

Hamers, et al., "A scanning tunneling microscopy study of the reaction of Si(001)–(2X1) with $NH_3$", J. Vac. Sci. Technol., Mar./Apr. 1988, A, vol. 6, No. 3, pp. 508–511.

Kirk, et al., "Low–temperature atomic force microscopy", Rev. Sci. Instrum., Jun. 1988, 59 (6), pp. 833–835.

Sonnenfield, et al., "Atomic Resolution Microscopy in Water", Science, Reprint Series, Apr. 11, 1986, vol. 232, pp. 211–213.

S. Jarvis, et al., "A Novel Force Microscope and Point Contact Probe", Dec., 1993, Rev. Sci. Instrum., vol. 64, No. 12, pp. 3515–3520.

A. Stewart, et al., "Use of Magnetic Forces to Control Distance in a Surface Force Apparatus", 1990, Meas. Sci. Technol., vol. 1, pp. 1301–1303.

S. Lindsay, et al., "Scanning Tunneling Microscopy and Atomic Force Microscopy Studies of Biomaterials at a Liquid–Solid InterFace", Jul./Aug. 1993, Journal Vacuum Science Technology, vol. 11, No. 4, pp. 808–815.

VARIABLE TEMPERATURE SCANNING PROBE MICROSCOPE BASED ON A PELTIER DEVICE

BACKGROUND OF THE INVENTION

1. Field of the Invention

This invention relates to scanning probe microscopes, particularly the scanning tunneling microscope (STM) and the atomic force microscope (AFM). Much extra information not obtainable with conventional STMs and AFMs is to be gained from studying samples that are either heated or cooled. However, the extreme dimensional stability required for successful operation of a scanning probe microscope limits the degree to which heating or cooling can be carried out, because thermal expansion or contraction of the microscope during the STM or AFM scanning process cannot be tolerated, even at an atomic level. This invention relates to a simple method for heating or cooling samples in a scanning probe microscope while retaining stable STM and/or AFM operation, even at the atomic level of resolution.

2. The Prior Art

Figure 1:
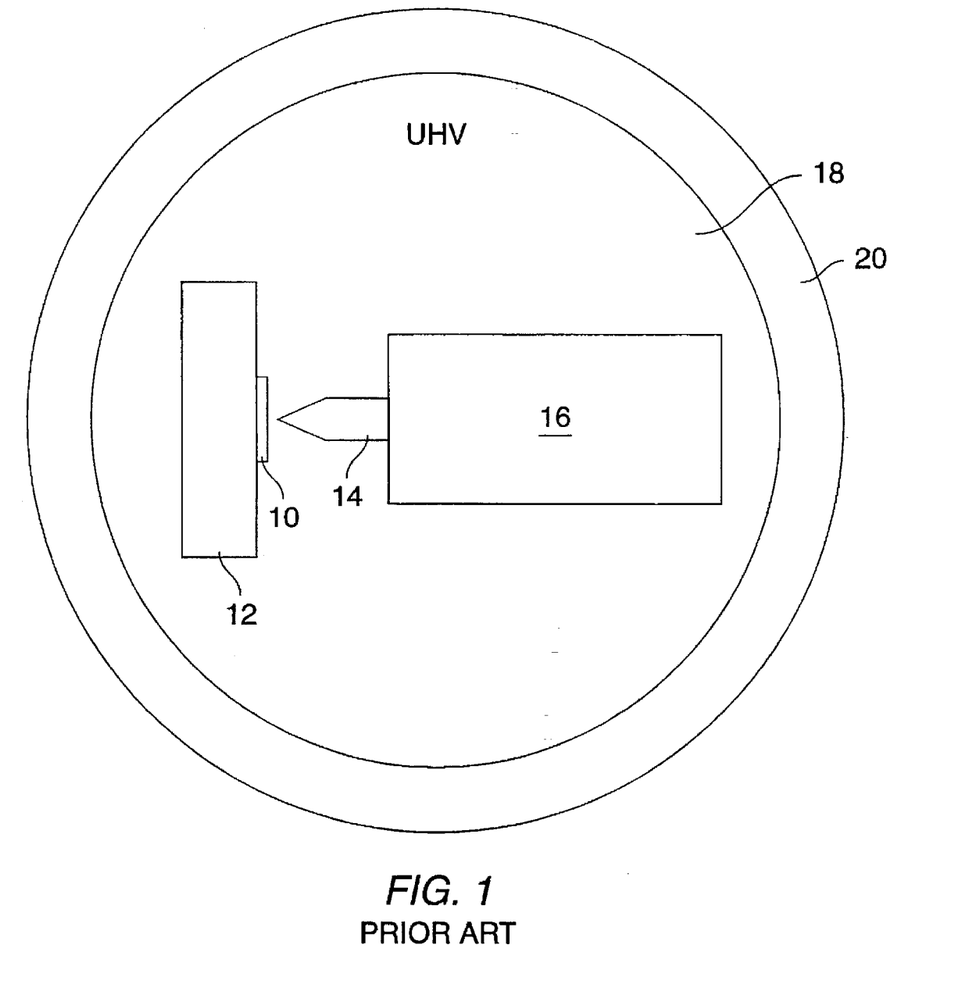
FIG. 1 is a highly schematic diagram of a variable-temperature ultrahigh vacuum scanning probe microscope according to the prior art.

The first successful operation of a variable temperature microscope was carried out in ultrahigh vacuum. An example of a commercial system which permits heating of the sample is the JSTM-4200 microscope available from JEOL Corporation of Tokyo, Japan. Referring to FIG. 1, the sample 10, is mounted on a stage 12 which may be heated (or cooled by the passage of cryogenic fluids). The system is sealed and built from ultrahigh vacuum (UHV) compatible components. A scanning tip 14 and scanner 16 are all mounted inside (18) an ultrahigh vacuum (UHV) chamber 20. The absence of convective heating or cooling confines the heating or cooling to the sample. The small mass of the tip 14 limits heat transfer into the rest of the microscope via tip 14. Radiative heat transfer can be minimized by careful placement of baffles. While this system works well for its intended purpose, it is limited to use in a vacuum environment. Thus, many volatile samples and hydrated biological materials cannot be studied with this apparatus.

Figure 2:
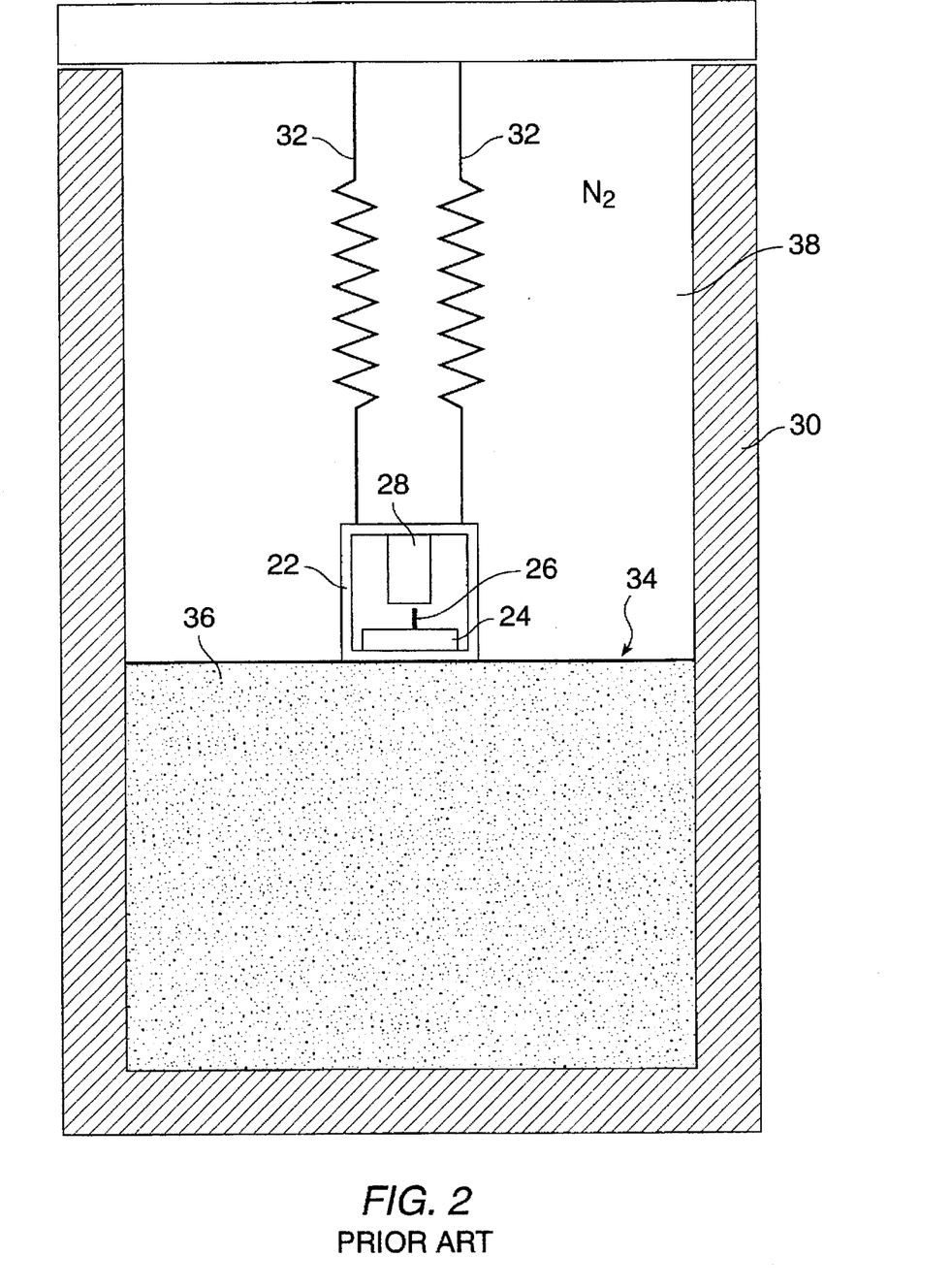
FIG. 2 is a schematic diagram of a variable temperature microscope operated in cryogenic gas according to the prior art. The whole microscope is cooled by being in close proximity to (or even touching) a body of cryogenic fluid.

In order to solve this problem, Zhifeng Shao and co-workers have developed a microscope which operates in a cold cryogenic gas. It is described in U.S. Pat. No. 5,410,910 issued May 2, 1992 to A. P. Somlyo, Zhifeng Shao, Jian Xun Mou and Jie Yang. The layout of this microscope is shown schematically in FIG. 2. The microscope 22, consisting of a sample stage 24, tip 26 and scanner 28 is immersed inside a cryogenic Dewar 30. Microscope 22 is suspended by springs 32 which serve as part of a vibration-isolation system. The microscope is held close to the surface 34 of a cryogenic fluid 36 such as liquid nitrogen ($LN_2$). In this way, the entire microscope is cooled. Condensation onto the microscope and the sample is avoided by operating in an environment of dry nitrogen gas 38. The system is preferably pressurized to prevent boiling of the $LN_2$ and to ensure quiet operation of the microscope 22. This system has produced spectacular images of biological molecules, but it is cumbersome to operate. This is because the whole microscope must be kept at low temperatures. The sample and replacement scanning probe tips have to be passed into the Dewar via a transfer system (not shown) that prevents moist air from entering the Dewar. Accordingly, it is desirable to provide an improved STM/AFM device in which the sample may be heated or cooled, as desired, while providing easy access to tips, substrates and samples in a stable fashion so as to render atomic resolution images of heated/cooled specimens possible.

SUMMARY OF THE INVENTION

A compact Peltier Device is used to heat or cool a small sample stage of a scanning probe (AFM or STM) microscope. The entire heating/cooling system may fit onto a small platen which may be suspended below the scanning probe where it may be held in place against magnetic balls. Alternatively, the sample stage may be supported by a Peltier Device, itself supported by a scanner such as a Piezoelectric scanner with a scanning probe tip held fixedly above the sample stage. The side of the Peltier Device in contact with the platen is cooled (or heated) by a small flow of water through a heat exchanger. The reservoir of water is held at ambient temperature, minimizing the temperature gradient generated between the sample platen and the main body of the microscope. The small mass of the sample stage results in rapid heating or cooling so that an equilibrium is attained rapidly. Heat transfer through the scanning tip is negligible. Condensation and contamination of the sample is prevented by operating the entire sample chamber in an inert gas environment. The inert gas is also at ambient temperature. Water and other contaminants are first removed from the gas by passing it over cold baffles. It is then equilibrated back up to ambient temperature in a heat exchanger. The variable temperature stage is easily incorporated into the design of the microscope described in my prior patent application, U.S. patent application Ser. No. 08/388,068, filed Feb. 10, 1995 and entitled "Scanning Probe Microscope for Use in Fluids" which is hereby incorporated herein by reference as if set forth fully herein.

OBJECTS AND ADVANTAGES OF THE INVENTION

Accordingly, it is an object of the present invention to provide a microscope which operates at ambient temperature while only the sample is heated or cooled.

It is a further object of the present invention to provide a microscope that operates in an inert gas which is at ambient temperatures, facilitating the changing of tips and samples.

It is a further object of the present invention to provide a microscope in which the heating or cooling of the sample to the desired temperature is rapid.

Yet a further object of the present invention is to provide a microscope that operates in a stable manner and gives atomic resolution while the sample is held at a temperature far from ambient temperature.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 3:
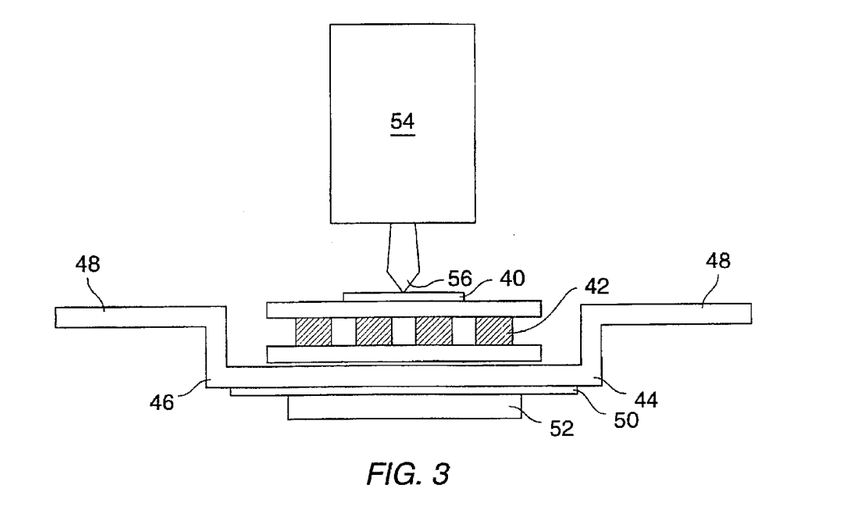
FIG. 3 is a schematic diagram of a heating/cooling stage according to a presently preferred embodiment of the present invention.

The layout of the heating/cooling sample stage according to a presently preferred embodiment of the present invention is shown in FIG. 3. A small sample stage 40, sits on top of a Peltier Device 42. The Peltier Device is composed of a number of semiconductor junctions operated at high current density. The semiconductors are chosen to have a relatively poor thermal conductivity, so that the heat carried by the electrons which traverse the junctions results in heating (or cooling) of the bottom (or top) of the device. Such devices are available from Melcor Corporation of Trenton, N.J. For example, the model number CP 0.8.71-08L is a single stage device just 18 mm square and 3.4 mm in thickness. When 2.1 amps is passed through it, it is capable of sustaining a temperature gradient of 67° C. and of removing heat at a rate of 10 W. Although the device is composed of alternating bars of p-type and n-type semiconductors, the semiconductors are connected by copper strips, so rectifying junctions are not formed. Therefore, the direction of current flow is easily reversed to cause heating on the top plate. This heating is limited by reliability considerations to +80° C.

The bottom (normally hot when used to cool the sample stage) of the Peltier Device is attached to sample platen 44. According to a presently preferred embodiment, the center 46 of platen 44 is fabricated from a material with a high thermal conductivity, such as aluminum or copper, and the peripheral ring 48 is fabricated from a poorer thermal conductor which is also magnetic (capable of being magnetized or attracted to magnets) such as magnetic stainless steel. This arrangement serves to isolate the main body of the microscope from residual thermal gradients while the magnetic nature of the periphery allows the stage to be adjustably suspended from three (or more) magnetic balls disposed on adjustable rods as described in my prior invention entitled "Scanning Probe Microscope for Use in Fluids", referred to above. A heat exchanger 50 is attached to the bottom of sample platen 44. According to a presently preferred embodiment of the present invention, heat exchanger 50 comprises a copper plate in contact with the bottom of sample platen 44 to which is soldered a loop of copper pipe 52 in a conventional arrangement. A small water flow through copper pipe 52 maintains the stage at a temperature only slightly different from ambient. Working fluids other than water and other forms of heat exchangers could also be used as would be known to those of ordinary skill in the art. For example, with a three-stage Peltier Device operated at 3 amps as a cooler, the sample has been held at −60° C. while the back of the sample platen 44 was only 3° C. above ambient with a water flow of just 50 ml/minute. This small flow did not disturb the microscope and atomic resolution was possible. The scanner 54 holds the scanning probe tip 56 (either STM or AFM) just above the surface of the sample. Operated in a dry gas environment, this arrangement is stable once the microscope has come into thermal equilibrium (typically a few tens of minutes to a few hours at most).

Figure 4:
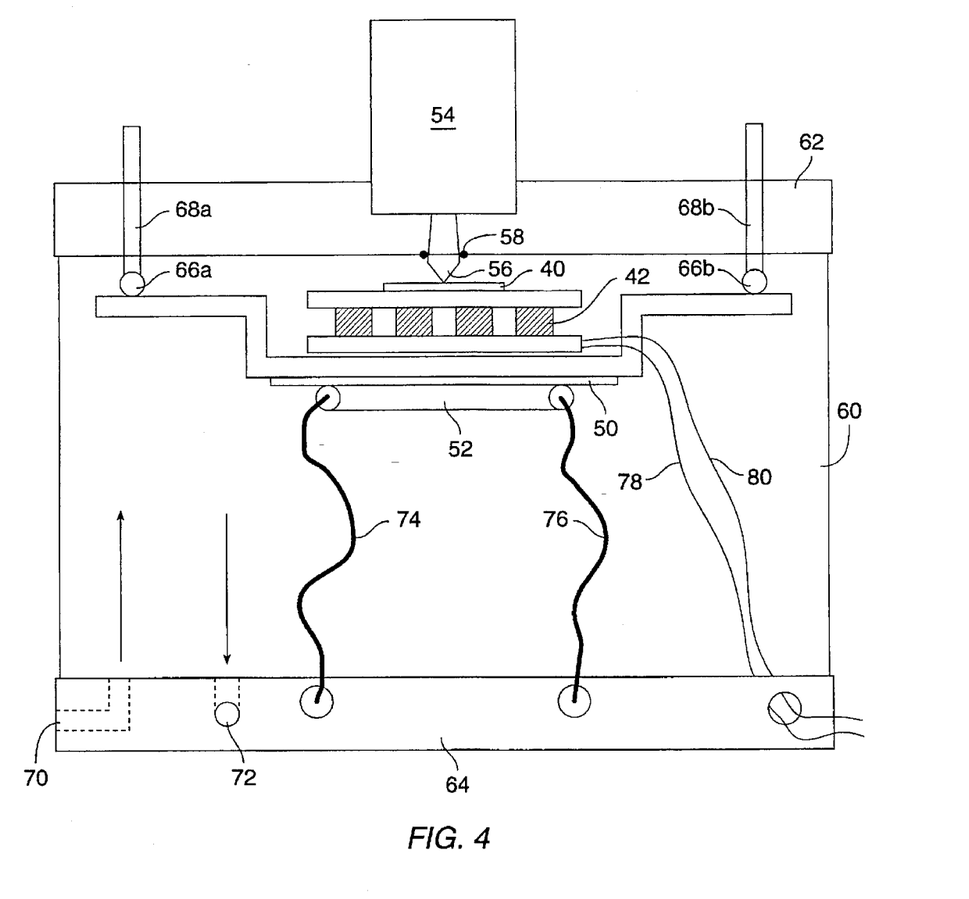
FIG. 4 is a schematic diagram of a heating/cooling stage located in place in the environmental chamber of the scanning probe microscope according to a presently preferred embodiment of the present invention.

The overall placement of the sample stage in the microscope is shown in FIG. 4. The overall microscope is described in my prior invention, referred to above. In this arrangement, a scanner 54 holds a scanning probe tip 56 (which may be an STM or an AFM probe tip) which extends through a flexible rubber seal 58 into a hermetically sealed chamber 60. Such scanners are typically voltage scannable X-Y (horizontal) or X-Y-Z (horizontal and vertical) piezoelectric, piezoceramic or similar scanners. Such scanners are well known in the art and commercially available from a number of suppliers well known to those of ordinary skill in the art. In one embodiment, the chamber 60 is a glass cylinder sealed at one end by the body (frame) of the microscope 62 and at the other end by a metal base plate 64. The chamber 60 and scanner 54 are secured in the body of the microscope 62. The sample platen 44 is suspended below the scanning probe tip 56 by magnetic balls 66a, 66b (a third ball 66c, not shown, completes the three-point mount). These balls grip the magnetic portion of the sample platen 44. The balls 66a, 66b, 66c themselves are mounted onto the ends of adjustable rods or position adjusters 68a, 68b (and 68c (not shown)) used to set the tip-sample distance as described in my previous invention, referred to above. According to a presently preferred embodiment of the present invention, sample stage 40 and Peltier Device 42 are set in a recess in platen 44 so as to minimize the length of the adjustments to position adjusters 68a, 68b, 68c. Gas inlet 70 and outlet 72 pipes permit chamber 60 to be flushed with dry gas. Pipes (not shown) are connected to flexible tubes 74, 76 which transfer cooling water into and out of copper pipe 52 of heat exchanger 50. Electrical wires 78, 80 connect the Peltier Device to a conventional power supply (not shown) located outside of chamber 60. Another set of wires (not shown) allow signals from thermocouple temperature sensors (not shown) to pass out of the chamber. These sensors monitor the temperature of the sample stage and the back of the platen. The sample stage sensor can be used in conjunction with a standard temperature controller unit to regulate the sample temperature. The temperature control and sensor apparatus is conventional and well known to those of ordinary skill in the art and need not be further described herein in order to avoid overcomplicating the disclosure.

Figure 5:
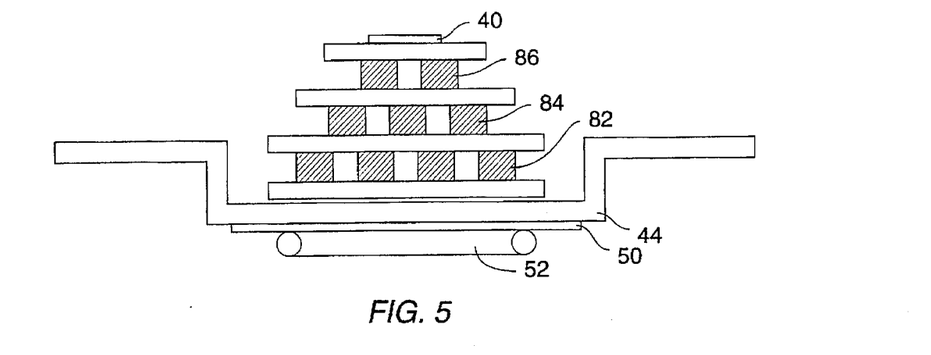
FIG. 5 is a schematic diagram showing a sample stage with a multi-stage Peltier Device to achieve a greater range of cold temperatures in accordance with a preferred embodiment of the present invention.

In practice temperature gradients of about 40° C. have been obtained with single stage Peltier Devices operated at about one or two amps. This is inadequate for many applications. For example, in order to completely freeze the motion of water in biological samples, it is necessary to obtain a temperature of below about 220° K. In order to achieve these colder temperatures, a multistage Peltier Device has been used. These devices are also commercially available. They consist of two (or more) Peltier Devices stacked one on top of the other so that the temperature drop across each device is added to give the total drop. An example of a sample stage equipped with a three-stage cooler is shown in FIG. 5. An example of a suitable three-stage cooler is the model number 3 CP 055 065-71-31-17 from Melcor Corporation of Trenton, N.J. In FIG. 5 the first stage is denoted 82, the second stage is denoted 84 and the third stage is denoted 86. The sample stage 40 is fastened on top of the third stage 86 and the first stage 82 is fastened to the sample platen 44 and heat exchanger 50 to which is attached copper cooling tube 52 described above. Atomic resolution has been achieved with such a three element cooling device. Temperature differentials of 90° C. have been achieved at 3 amps of applied current.

Figure 6:
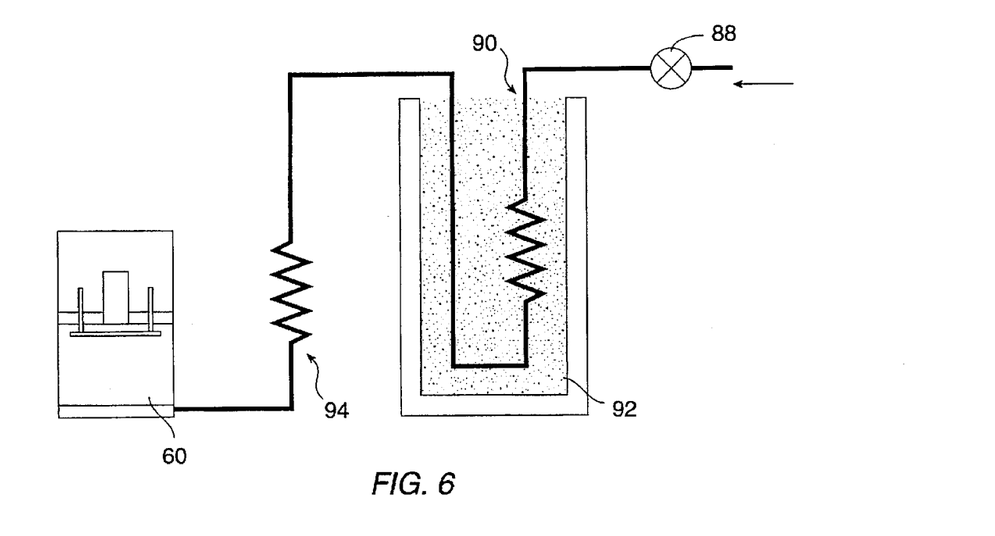
FIG. 6 is a schematic diagram showing the gas purification and temperature equilibration system used to ensure that clean gas at ambient temperature is injected into the microscope chamber according to a presently preferred embodiment of the present invention.

It is essential that the gas used to flush the environmental chamber be free from contamination which could attach to the sample stage 40. In particular, ice crystals will form on the cold sample stage if water is present. For this reason, the gas is pretreated to remove condensable contamination by passing it over baffles held at cryogenic temperatures. The baffles cause condensable matter to condense out on the baffles before enterlag chamber 60. The gas is then passed through a heat exchanger where its temperature is brought back to room ambient temperature. One arrangement for achieving this is shown in FIG. 6. The flow of gas from a cylinder (not shown) of a high purity, non-reactive gas (such as Nitrogen ($N_2$), Argon (Ar), other inert gasses such as the noble gasses: He, Ne, Ar, Kr, Xe, Rn, and combinations of the foregoing) is regulated by the valve 88. The gas then passes through a long coil 90 (which may contain baffles) which is immersed in a cryogenic fluid such as $LN_2$ 92. The gas is then passed through a second coil 94 which is maintained at room ambient temperature. In one embodiment, the coil consists of several meters of small-bore copper tubing. The gas, now warmed to ambient temperature, is then passed through the microscope environmental chamber 60 by entering at inlet 70 and exiting at outlet 72 as shown in FIG. 4. Water and other contamination condenses in the cooling coil 90.

Figure 7:
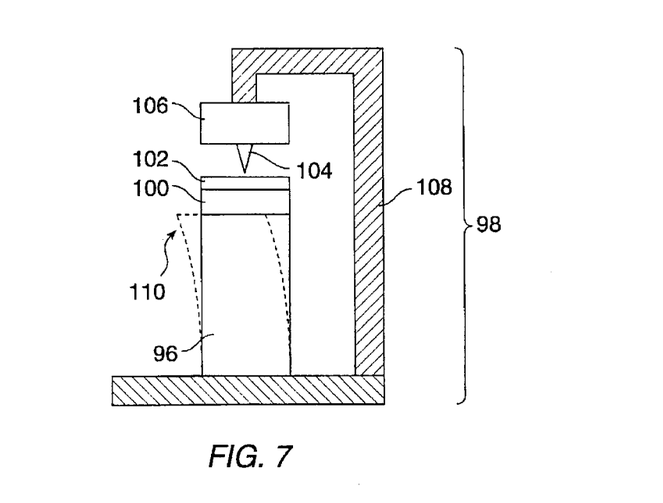
FIG. 7 is a schematic diagram of an alternative embodiment of the present invention wherein the scanner element is located on the bottom and supports both the Peltier Device and the sample stage. A fixed probe tip operates above the scanning sample stage.

FIG. 7 is a schematic diagram of an alternative embodiment of the present invention wherein the scanner element 96 is located on the bottom of the microscope 98 and supports both the Peltier Device 100 and the sample stage 102. A fixed probe tip 104 operates above the scanning sample stage 102. Probe tip 104 may be fixed to a vertical axis control 106 which may be manually controlled, computer controlled, or controlled by a Z-axis (vertical) piezo-electric or piezoceramic tube. In operation, probe tip (AFM or STM) 104 is fixed with respect to frame 108 as is the bottom of scanner 96. Motion of scanner 96 in one direction is depicted in phantom line at 110 in FIG. 7.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A scanning probe microscope for examining the surface properties of a sample surface, said microscope comprising:
    a frame;
    a probe tip;
    a sample stage for receiving the sample surface;
    a scanner for generating scanning relative displacement between said probe tip and said sample stage; and
    a Peltier Device thermally coupled to said sample stage for controlling the temperature of said sample stage; and
    a hermetically sealed containment enclosing said probe tip, said Peltier Device and said sample stage, said hermetically sealed containment including a flexible sealing member through which said probe tip is extended.

2. A microscope according to claim 1 wherein said hermetically sealed containment is flushed with a dry inert gas at ambient room temperature.

3. A microscope according to claim 2 wherein said inert gas is selected from the group consisting of: Nitrogen, Helium, Neon, Argon, Krypton, Xenon, Radon and combinations of the foregoing.

4. A microscope according to claim 1 further comprising a heat exchanger attached to said Peltier Device.

5. A microscope according to claim 4 wherein said heat exchanger includes a tube for carrying a working medium from a reservoir of said working medium held at a predetermined temperature through said tube so as to regulate the temperature of said heat exchanger.

6. A microscope according to claim 5 wherein said working medium is water.

7. A microscope according to claim 6 wherein said predetermined temperature is room ambient temperature.

8. A scanning probe microscope for examining the surface properties of a sample surface, said microscope comprising:
    a frame;
    a scanner mounted to said frame and suspended therefrom;
    a probe tip mounted to a free end of said scanner;
    at least three adjustable support mounts extending downwardly from said frame;
    each of said three adjustable mounts including a rounded magnetic portion at a distal end thereof;
    a sample platen formed of a material attracted to magnets adapted to be suspended from said rounded magnetic portions of said support mounts;
    a sample stage for receiving a sample surface, said sample stage coupled to said sample platen;
    a Peltier Device thermally coupled to said sample stage for controlling the temperature of said sample stage; and
    a hermetically sealed containment enclosing said probe tip, said Peltier Device and said sample stage, said hermetically sealed containment including a flexible sealing member through which said probe tip is extended.

9. A microscope according to claim 8 wherein said microscope further comprises a hermetically sealed containment enclosing said probe tip, said Peltier Device, said sample platen and said sample stage.

10. A microscope according to claim 9 wherein said hermetically sealed containment is flushed with a dry inert gas at ambient room temperature.

11. A microscope according to claim 10 wherein said inert gas is selected from the group consisting of: Nitrogen, Helium, Neon, Argon, Krypton, Xenon, Radon and combinations of the foregoing.

12. A microscope according to claim 8 further comprising a heat exchanger attached to said Peltier Device.

13. A microscope according to claim 12 wherein said heat exchanger includes a tube for carrying a working medium from a reservoir of said working medium held at a predetermined temperature through said tube so as to regulate the temperature of said heat exchanger.

14. A microscope according to claim 13 wherein said working medium is water.

15. A microscope according to claim 14 wherein said predetermined temperature is room ambient temperature.

16. A scanning probe microscope for examining the surface properties of a sample surface, said microscope comprising:
   a frame;
   a piezoelectric scanner having a first end and a second end, said first end attached to said frame;
   a probe tip mounted to said second end of said scanner;
   at least three adjustable support mounts extending downwardly from said frame;
   each of said three adjustable mounts including a rounded magnetic portion at a distal end thereof;
   a sample platen formed of a material attracted to magnets adapted to be suspended from said rounded magnetic portions of said support mounts;
   a sample stage for receiving a sample surface, said sample stage coupled to said sample platen;
   a Peltier Device thermally coupled to said sample stage for controlling the temperature of said sample stage; and
   a hermetically sealed containment enclosing said probe tip, said Peltier Device and said sample stage, said hermetically sealed containment including a flexible sealing member through which said probe tip is extended.

17. A microscope according to claim 16 wherein said microscope further comprises a hermetically sealed containment enclosing said probe tip, said Peltier Device, said sample platen and said sample stage.

18. A microscope according to claim 17 wherein said hermetically sealed containment is flushed with a dry inert gas at ambient room temperature.

19. A microscope according to claim 18 wherein said inert gas is selected from the group consisting of: Nitrogen, Helium, Neon, Argon, Krypton, Xenon, Radon and combinations of the foregoing.

20. A microscope according to claim 16 further comprising a heat exchanger attached to said Peltier Device.

21. A microscope according to claim 20 wherein said heat exchanger includes a tube for carrying a working medium from a reservoir of said working medium held at a predetermined temperature through said tube so as to regulate the temperature of said heat exchanger.

22. A microscope according to claim 21 wherein said working medium is water.

23. A microscope according to claim 22 wherein said predetermined temperature is room ambient temperature.

24. A method for performing controlled temperature scanning probe microscopy with a scanning probe microscope having a scanning probe tip suspended from a frame through an aperture in a flexible sealing member into a hermetically sealed containment, said containment also including a sample stage, a Peltier Device for controlling the temperature of said sample stage, and a sample platen to which said Peltier Device is mounted, said sample platen being suspended from said frame, said method comprising the steps of:
   flowing a dry inert gas at room ambient temperature through the containment;
   applying a selected electrical current to the Peltier Device to control the temperature thereof;
   controlling the temperature of a sample disposed on said sample stage with said Peltier Device;
   extending the probe tip through the aperture in the flexible sealing member; and
   scanning the probe tip over the surface of the sample in order to determine surface characteristics thereof.

25. A method according to claim 24 further comprising the additional step of:
   allowing the Peltier Device, probe tip, containment, sample stage and sample platen to come to thermal equilibrium prior to conducting the scanning step.

26. A method according to claim 24 further comprising the additional steps of:
   fixing a biological sample for scanning probe microscopy by:
   placing said sample into a thin water layer on an upper surface of said sample stage; and
   freezing said sample and said water layer by causing the Peltier Device to cool the sample stage to a temperature below about 0° C.

27. A method for performing controlled temperature scanning probe microscopy with a scanning probe microscope having a scanning probe tip suspended from a frame, extending through an aperture in a flexible sealing member, and disposed in a hermetically sealed containment, said containment also including a sample stage for receiving a sample surface for investigation, said sample stage disposed on a Peltier Device, said Peltier Device for controlling the temperature of said sample stage and being itself disposed on a scanner element for generating relative movement between said probe tip and said sample surface, said method comprising the steps of:
   flowing a dry inert gas at room ambient temperature through the containment;
   applying a selected electrical current to the Peltier Device to control the temperature thereof;
   controlling the temperature of a sample disposed on said sample stage with said Peltier Device;
   extending the probe tip through the aperture in the flexible sealing member; and
   causing relative scanning movement between the probe tip and the surface of the sample in order to determine surface characteristics of the sample surface.

28. A method according to claim 27 further comprising the additional step of:
   allowing the Peltier Device, probe tip, containment and sample stage to come to thermal equilibrium prior to conducting the scanning step.

29. A method according to claim 27 further comprising the additional steps of:
   fixing a biological sample for scanning probe microscopy by:
   placing said sample into a thin water layer on an upper surface of said sample stage; and
   freezing said sample and said water layer by causing the Peltier Device to cool the sample stage to a temperature below about 0° C.

30. A scanning probe microscope for examining the surface properties of a sample surface, said microscope comprising:
   a vertical axis control having a first end mounted to a frame and suspended therefrom;
   a probe tip mounted to a second end of said vertical axis control frame and suspended therefrom;
   a sample stage;
   a Peltier Device thermally coupled to said sample stage for controlling the temperature of said sample stage;
   a scanner element holding said Peltier Device and said sample stage underneath said probe tip, wherein said scanner element provides for scanning in two dimensions; and a hermetically sealed containment enclosing said probe tip, said Peltier Device and said sample stage, said hermetically sealed containment including a flexible sealing member through which said probe tip is extended.

31. A microscope according to claim 30 wherein said microscope further comprises a hermetically sealed containment enclosing said fixed probe tip, said scanner element, said Peltier Device, and said sample stage.

32. A microscope according to claim 31 wherein said hermetically sealed containment is flushed with a dry inert gas at ambient room temperature.

33. A microscope according to claim 32 wherein said inert gas is selected from the group consisting of Nitrogen, Helium, Neon, Argon, Krypton, Xenon, Radon, and combinations of the foregoing.

* * * * *